(12) United States Patent
Kwon et al.

(10) Patent No.: US 8,298,093 B2
(45) Date of Patent: Oct. 30, 2012

(54) TELESCOPIC SHAFT FOR VEHICLE

(75) Inventors: O Hun Kwon, Namdong-gu (KR); Byung Kook Yoo, Yeonsu-gu (KR)

(73) Assignee: Deok Chang Machinery Co., Ltd., Incheon (KR)

( * ) Notice: Subject to any disclaimer, the term of this patent is extended or adjusted under 35 U.S.C. 154(b) by 147 days.

(21) Appl. No.: 12/682,284

(22) PCT Filed: Oct. 15, 2008

(86) PCT No.: PCT/KR2008/006068
§ 371 (c)(1),
(2), (4) Date: Apr. 9, 2010

(87) PCT Pub. No.: WO2009/051395
PCT Pub. Date: Apr. 23, 2009

(65) Prior Publication Data
US 2010/0210370 A1   Aug. 19, 2010

(30) Foreign Application Priority Data
Oct. 15, 2007 (KR) .......... 10-2007-0103660
Sep. 2, 2008 (KR) .......... 10-2008-0086332

(51) Int. Cl.
*F16C 3/035* (2006.01)
(52) U.S. Cl. .......... 464/167; 384/49

(58) Field of Classification Search .......... 464/167; 384/10, 49, 54, 55, 908
See application file for complete search history.

(56) References Cited

U.S. PATENT DOCUMENTS
3,977,739 A * 8/1976 Moskowitz et al.
4,433,875 A * 2/1984 Walter et al. .......... 384/49
4,898,566 A * 2/1990 Hakansson .......... 464/167

FOREIGN PATENT DOCUMENTS
JP  2003-336658  11/2003
JP  2005-344747  12/2005
JP  2007-192340  8/2007

* cited by examiner

*Primary Examiner* — Gregory Binda
(74) *Attorney, Agent, or Firm* — Sherr & Jiang, PLLC

(57) ABSTRACT

A telescopic shaft including a male shaft including a plurality of first splines formed on an outer circumferential surface in an axial direction and a fixing groove and a derail prevention protrusion which are formed on outer circumferential surfaces at one end and a middle portion of the male shaft in a radius direction, a female shaft including a hollow and a plurality of second splines formed on an inner circumferential surface of the hollow corresponding to the plurality of first splines, a plurality of balls disposed between grooves of the plurality of first splines and grooves of the plurality of second splines, a leaf spring having a plate shape and inserted into the plurality of first spline grooves, and a fixing ring connected to the fixing groove and surrounding one end of the leaf spring to prevent the leaf spring from derailing.

2 Claims, 8 Drawing Sheets (a)

-Prior Art-

TELESCOPIC SHAFT FOR VEHICLE

CROSS REFERENCE TO PRIOR APPLICATIONS

This application is a National Stage Patent Application of PCT International Patent Application No. PCT/KR2008/006068 (filed on 15 Oct. 2008) under 35 U.S.C. 371, which claims priority to Korean Patent Application Nos. 10-2007-0103660 (filed on 15 Oct. 2007) and 10-2008-0086332 (filed on 2 Sep. 2008), which are all hereby incorporated by reference in their entirety.

TECHNICAL FIELD

The present invention relates to a telescopic shaft and, more particularly, to a telescopic shaft including a plurality of balls that move between grooves of a plurality of first splines and grooves of a plurality of second splines respectively formed in a male shaft and a female shaft and an elastic member such as a leaf spring in order to reduce vibration generated by kickback and transferred to a driver.

BACKGROUND ART

In general, a vehicle includes a telescopic shaft that transfers a power of controlling a steering wheel to a gear unit. The telescopic shaft includes a female shaft and a male shaft. One end of the female shaft is connected to a steering column, and one end of the male shaft is connected to a steering gear.

While a driver is driving a vehicle, the driver feels vibration or kick-back generated from an uneven road surface because the telescopic shaft is indirectly connected to wheels of the vehicle. Such vibration and kick-back disturb a driver to control the vehicle.

DISCLOSURE OF INVENTION

Technical Problem

Figure 1:
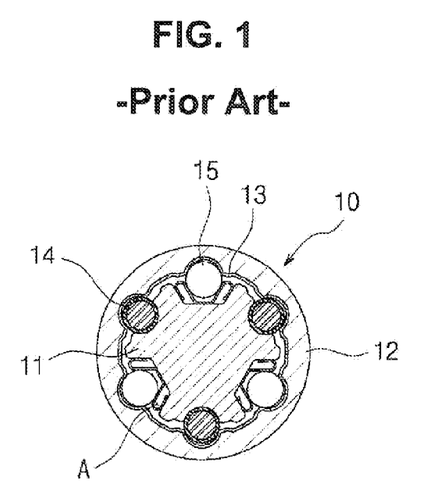
FIG. 1 is a cross-sectional view of a telescopic shaft according to the related art.

FIG. 1 is a cross-sectional view of a telescope shaft according to the related art (Japan Patent Publication No 2006-224767).

In order to overcome the problem of a conventional telescope shaft, a telescopic shaft 10 according to the related art includes a spring 13 between a male shaft 11 and a female shaft 12 for supporting a ball 15 as shown in FIG. 1. However, the telescopic shaft 10 according to the related art was easily broken if the telescopic shaft 10 is excessively deformed. In order to overcome such a problem, the telescopic shaft 10 according to the related art includes needles 14 to increase hardiness thereof.

However, the needles 14 limit the movement of the telescopic shaft in an axial direction due to a fractional force when a driver steers wheels. Therefore, impact or kickback, which is generated when the vehicle runs on an unevenness road, is transferred to a driver.

Furthermore, the spring 13 includes bending portions A at both ends thereof, which are designed to absorb vibration (two-points support). Due to the bending portions A, a diversion is generated when a driver controls wheels.

The spring is generally manufactured through a press process. The press process has limitation to minimize the bending portions A. Accordingly, the telescopic shaft according to the related art has limitation in redwing a controlling interval generated when a driver steers wheels.

Also, the telescopic shaft according to the related art has a problem that the size of the bending portion A increases in proportional to a standard of the telescopic shaft.

That is, the structure of the telescopic shaft according to the related art cannot attenuate vibration transferred from a road surface when a vehicle is moving on an unevenness road and improve respondence of steering wheels. Also, the telescopic shaft according to the related art cannot minimize the controlling interval smaller than a predetermined value.

Technical Solution

In accordance with one aspect of the present invention, there is a telescopic shaft including a male shaft including a plurality of first splines formed on an outer circumferential surface in an axial direction and a fixing groove and a derail prevention protrusion which are formed on outer circumferential surfaces at one end and a middle portion of the male shaft in a radius direction, a female shaft including a hollow and a plurality of second splines formed on an inner circumferential surface of the hollow corresponding to the plurality of first splines, a plurality of balls disposed between grooves of the plurality of first splines and grooves of the plurality of second splines, a leaf spring having a plate shape and inserted into the plurality of first spline grooves, and a fixing ring connected to the fixing groove and surrounding one end of the leaf spring to prevent the leaf spring from derailing.

The leaf spring may include a groove on one side to form dimples of the plurality of balls.

In the plurality of first spline grooves, a groove having a '⊓' shaped cross-section may be formed to separate the leaf spring at a distance.

Surfaces of the plurality of balls may be coated with nylon to reduce vibration and noise.

In accordance with another aspect of the present invention, there is a telescopic shaft including a male shaft including a plurality of first splines formed on an outer circumferential surface in an axial direction, a female shaft including a plurality of second splines formed on an inner circumferential surface of a hollow corresponding to the plurality of first splines, a leaf spring having a plate shape and inserted into the plurality of first spline grooves, and a plurality of balls disposed between grooves of the plurality of first splines and grooves of a plurality of second splines. The male shaft includes a first derail prevention protrusion formed on an outer circumferential surface at a middle portion in a radius direction, a first fixing groove formed at a side of the first derail prevention protrusion in an opposite direction of the plurality of first splines, a second derail prevention protrusion formed on an outer circumferential surface at one end of the plurality of first splines, and a second fixing groove formed on an outer side of the second derail prevention protrusion. The leaf spring includes one end extending to the first fixing groove and fixed by a fixing ring and the other end extending to the second fixing groove and fixed by a fixing ring.

The second derail prevention protrusion may be formed by a form rolling process.

In accordance with still another aspect of the present invention, there is a telescopic shaft includes a male shaft having a plurality of first splines formed on an outer circumferential surface in an axial direction, a female shaft having a plurality of second splines on an inner circumferential surface of a hollow corresponding to the plurality of first splines, a plurality of balls disposed between grooves of the plurality of first splines and grooves of the plurality of second splines, and a leaf spring having a plate shape and inserted in the plurality of first splines grooves. The male shaft includes a third derail prevention protrusion formed on an outer circumferential surface at a middle portion in a radius direction, a third fixing groove formed at a side of the third derail prevention protrusion in an opposite direction of the plurality of first splines, and a fourth fixing groove formed on an outer circumferential surface at one end of the plurality of first splines in a radius direction. The leaf spring includes one end extending to the third fixing groove and fixed by a fixing ring and the other end fixed at an inner side of the fourth derail prevention protrusion by a fixing ring.

The fourth derail prevention protrusion may be formed through a spinning process.

Advantageous Effects

A telescopic shaft according to the present invention has following advantageous effects.

At first, the telescopic shaft according to the present invention can attenuate vibration transferred from a road surface and improve respondence of steering wheels.

Secondly, the telescopic shaft according to the present invention includes balls instead of needles, thereby allowing the telescopic shaft to move in a length direction. Therefore, the telescopic shaft according to the present invention can reduce influence of kickback.

Thirdly, the telescopic shaft according to the present invention includes a derail prevention protrusion that functions as a stopper plate. Therefore, a manufacturing process of the telescopic shaft according to the present invention is comparatively simple and a hardness of a male shaft increases.

Fourthly, the telescopic shaft according to the present invention has comparatively great hardness by forming a derail prevention protrusion through a form rolling process or a spinning process.

Fifthly, an axial diameter of a fixing groove portion of a male shaft generally increases. Therefore, it is easy to fix a fixing ring and to assembly.

BRIEF DESCRIPTION OF THE DRAWINGS

The above and other objects and features of the present invention will become apparent from the following description of the preferred embodiments given in conjunction with the accompanying drawings, in which.

BEST MODE FOR CARRYING OUT THE INVENTION

The advantages, features and aspects of the invention will become apparent from the following description of the embodiments with reference to the accompanying drawings, which is set forth hereinafter. Terms and words used in specification and claims must not be understood as typical or dictionary meaning only. Terms and words may be understood as meanings and concepts corresponding to technical aspects of the present invention based on the principle that inventors may properly define concepts of terms in order to describe own invention with the best method.

Therefore, embodiments described in specification and configurations shown in accompanying drawings are only an embodiment of the present invention. Since the embodiments and the configurations may not represent all of technical aspects of the present invention, there may be various equivalents and modifications which can replace the embodiments and the configuration at a time of filing a related application.

Hereinafter, a telescopic shaft according to the first embodiment of the present invention will be described.

Figure 2:
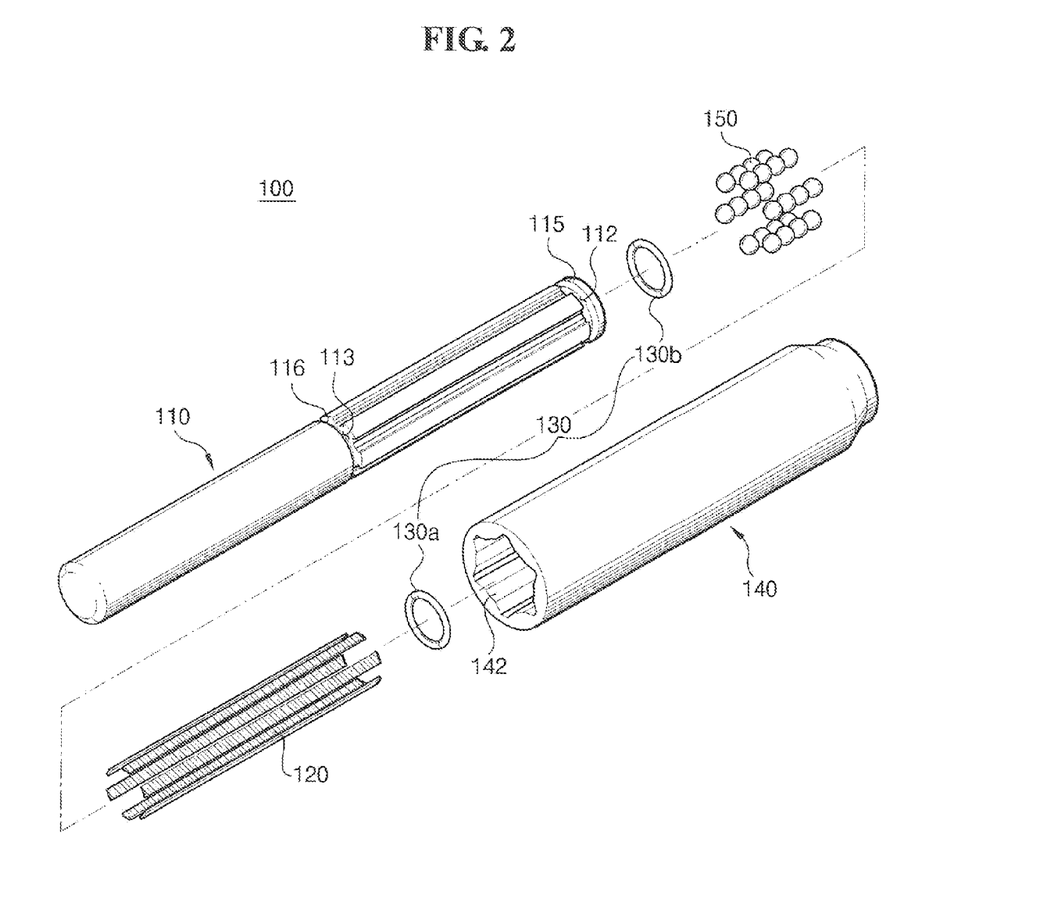
FIG. 2 is an exploded perspective view illustrating a telescopic shaft according to the first embodiment of the present invention.
Figure 3:
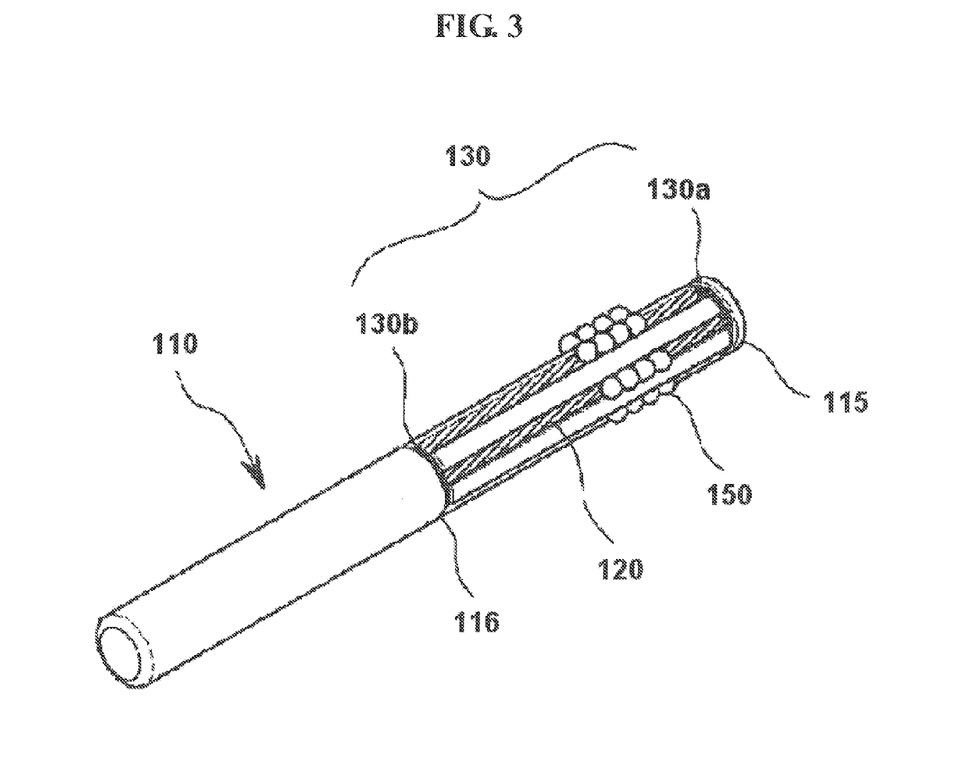
FIG. 3 is a partial perspective view illustrating a telescopic shaft according to the first embodiment of the present invention.
Figure 4:
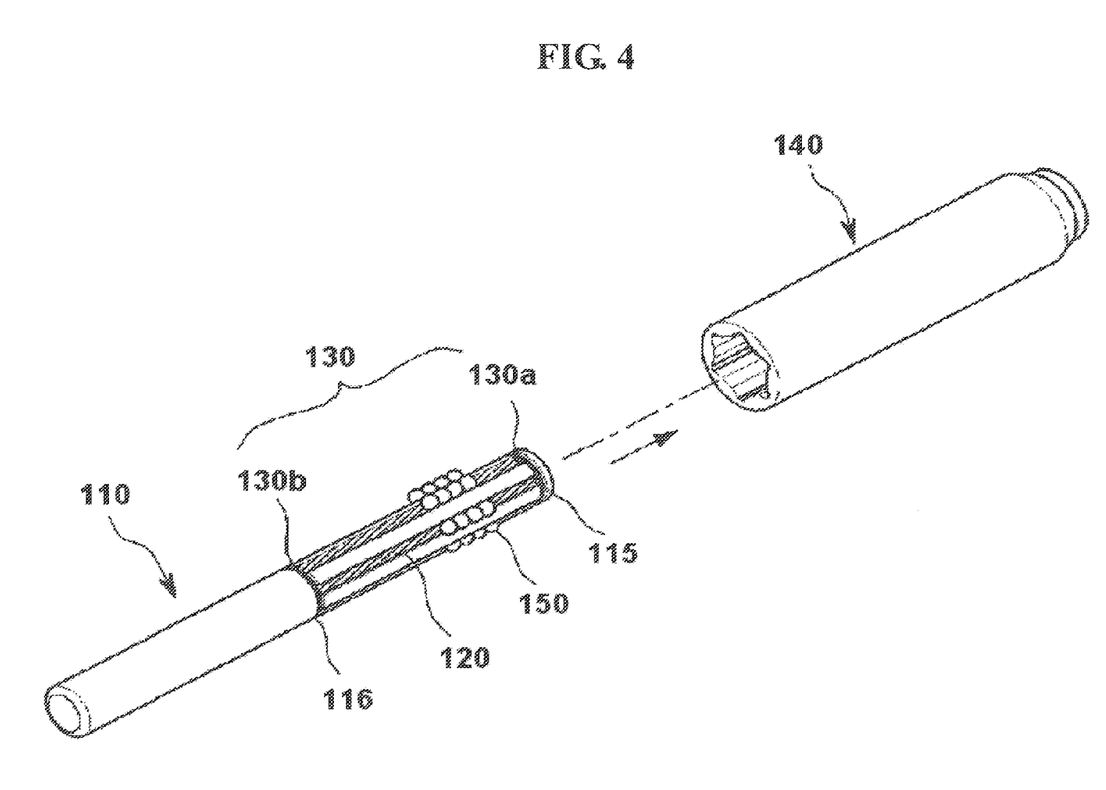
FIG. 4 is a perspective view of a telescopic shaft of FIG. 2.
Figure 5:
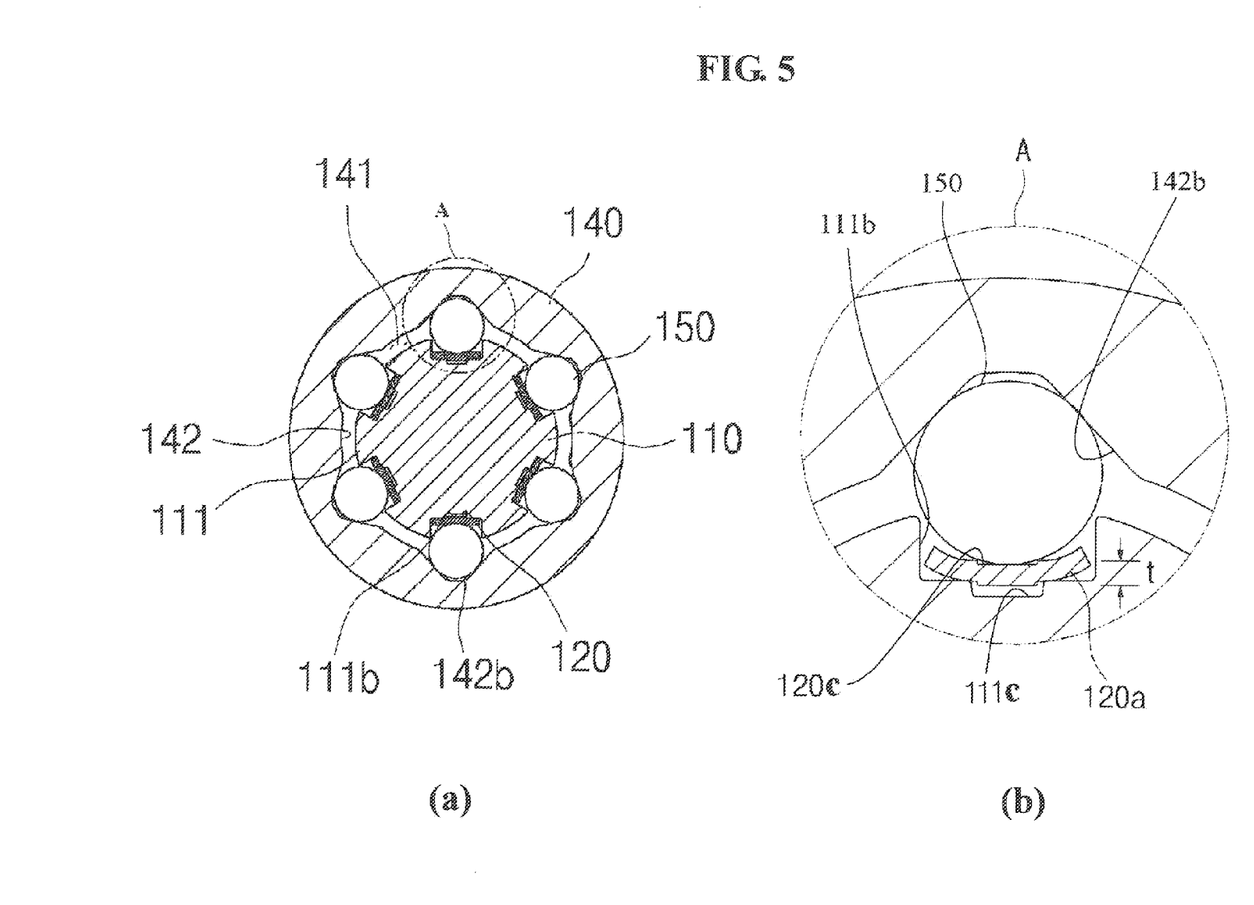
FIG. 5(a) is a vertical cross-sectional view of a telescopic shaft according to the first embodiment of the present invention and FIG. 5(b) is an enlarged view of a part A of FIG. 5(a)
Figure 6:
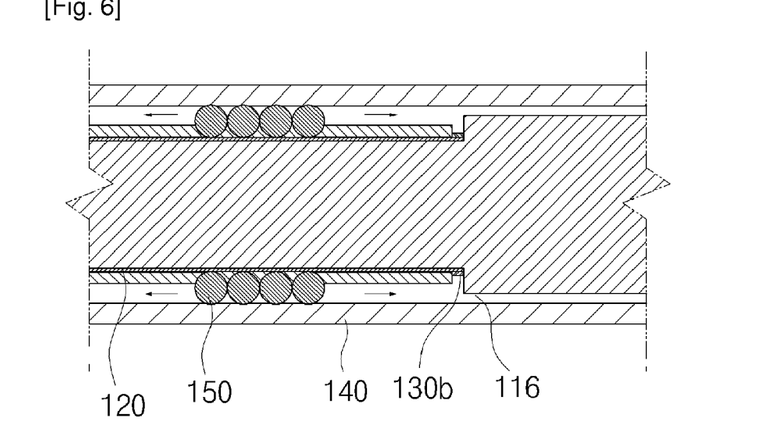
FIG. 6 is a horizontal cross-sectional view of a telescopic shaft according to the first embodiment of the present invention.
Figure 7:
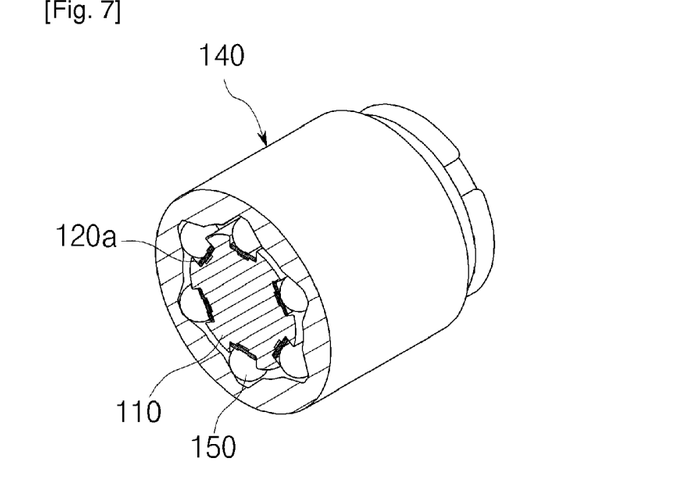
FIG. 7 is a perspective view of a part of a telescopic shaft according to the first embodiment of the present invention.

FIG. 2 is an exploded perspective view illustrating a telescopic shaft according to the first embodiment of the present invention, FIG. 3 is a partial perspective view illustrating a telescopic shaft according to the first embodiment of the present invention, FIG. 4 is a perspective view of a telescopic shaft of FIG. 2, FIG. 5(a) is a vertical cross-sectional view of a telescopic shaft according to the first embodiment of the present invention, FIG. 5(b) is an enlarged view of a part A of FIG. 5(a), FIG. 6 is a horizontal cross-sectional view of a telescopic shaft according to the first embodiment of the present invention, and FIG. 7 is a perspective view of a part of a telescopic shaft according to the first embodiment of the present invention.

As shown in FIGS. 2 to 7, the telescopic shaft 100 according to the first embodiment includes a male shaft 110 and a female shaft 140.

The male shaft 110 includes a plurality of first splines 111 formed on an outer circumferential surface in an axial direction, first spline grooves 111b formed between the adjacent first splines 111, a fixing groove 112 and a derail prevention protrusion 115 formed on an outer circumferential surface at one end thereof in a radius direction, and a fixing groove 113 and a derail prevention protrusion 116 formed on a circumferential surface at a middle portion of the mail shaft 110.

Also, a fixing ring 130a is disposed in the fixing groove 112. The fixing ring 130a surrounds and fixes the leaf spring.

Fixing rings 130a and 130b connected to a fixing groove 113 prevent the leaf spring 120 from derailing.

Derail prevention protrusions are formed at one side of the fixing groove. The derail prevention protrusions 115 and 116 function as a stopper that limits the movement of the balls 150 in an axial direction.

A hollow 141 is formed inside the female shaft 140. A plurality of second splines 142 are formed on an inner circumferential surface of the hollow 141 corresponding to the plurality of first splines 111. Second spline grooves 142b are formed between adjacent second splines 142 like the first splines 111.

The telescopic shaft according to the first embodiment includes a plurality of balls 150 that move between a first spline groove 111b and a second spline groove 142b. The balls 150 enable the male shaft 110 to make vertical movements in an axial direction inside the female shaft 140, thereby increasing a movement range.

Vibration and noise can be further reduced by coating the surfaces of the plurality of balls 150. Particularly, it is preferable to coat the surfaces of balls 150 with nylon material.

The leaf springs 120 are inserted in each of the first spline grooves 111b.

As shown in FIG. 1, the telescopic shaft according to the related art includes the bending spring 13 that has the bending parts A at both ends thereof which is designed to absorb vibration (two-points support). Therefore, the telescopic shaft according to the related art has a limitation to minimize a controlling interval of steering wheels, which is generated by the bending portions A. Also, the telescopic shaft according to the related art has a problem that the size of the bending portion A increases in proportional to a standard of the telescopic shaft.

Unlikely, the telescopic shaft according to the present embodiment has a structure supporting the leaf spring 120 and the balls 150 at one point using the leaf spring 120 formed in a plate shape. Such a structure increases an elastic modulus and decreases deformation, thereby minimizing a diversion generated when a driver turns wheels.

Also, the telescopic shaft according to the related art includes the needles 14 as shown in FIG. 1. The needles 14 are easily deformed by a thermal process or an external impact. If the needles are deformed, or if the first and second splines are not straightly formed, the needles cannot slide along the first and second spline grooves when the female shaft and the male shaft move in an axial direction. That is, the needles are stacked at an inside surface of the first and second spline grooves. The needles disturb the female shaft and the male shaft to move in the axial direction.

In case of the present embodiment, the balls 150 contacting the leaf spring 120 can move in the axial direction along the first and second spline grooves although the first and second spline grooves are deformed. Therefore, the balls 150 do not disturb the movement of the female and male shaft in the axial direction.

In case of the telescopic shaft having the needles according to the related art, the female shaft and the male shaft cannot make relative movement in an axial direction when a driver steers wheels. Therefore, the telescopic shaft according to the related art transfers impact to the driver as it is when the driver steers wheels on an unevenness road. In case of the telescopic shaft according to the present embodiment, the female shaft and the male shaft can make relative movement in an axial direction although a driver steers wheels, thereby redwing the influence of vibration caused by kick-back.

In other words, it is possible to attenuate the influence of kickback transferred to a steering wheel from a road surface and to improve respondence of controlling a steering wheel using the telescopic shaft 100 according to the present embodiment.

As shown in a part A of FIGS. 5(a) and 5(b), it is preferable that the leaf spring 120a according to the present invention includes a depression 120c at one side thereof in order to one-point support the ball 150.

That is, a weak part is prepared by forming the depression 120c on one side of the leaf spring 120a where faces the ball 150 and a pressure is applied to the weak part, thereby preventing an unintentional dimple from generating and preventing the leaf spring 120a from irregularly deforming.

As shown in the part A of FIGS. 5(a) and 5(b), it is preferable that the first spline groove further include a recess 111c formed on a bottom of the first spline groove 111b.

If a thickness t of the leaf spring 120a increases, the elastic modulus of the spring increases, thereby redwing a controlling interval which is a rotation angle of a telescopic shaft. Therefore, it is possible to simply control the attenuation of kickback and the respondence of steering wheels by controlling a thickness of the leaf spring.

Figure 8:
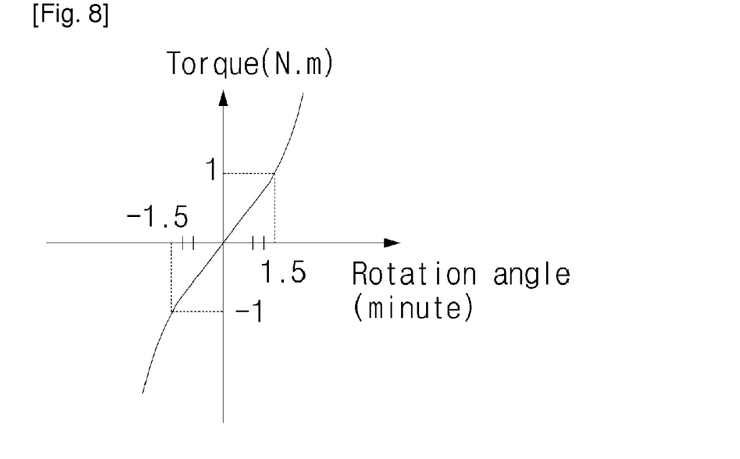
FIG. 8 is a graph showing a simulation result of a telescopic shaft according to the first embodiment of the present invention.

FIG. 8 is a graph showing a simulation result of a telescopic shaft according to the present embodiment.

As shown in FIG. 8, the telescopic shaft according to the present embodiment generate only three minutes of a rotation angle as a controlling interval for torque of ±1 Nm, which is significantly smaller than that of the telescopic shaft according to the related art.

If the torque increases greater than ±1 Nm, the rotation angle gradually increases without deformation while sustaining a perfect rigid body characteristics. Therefore, the influence of kickback can be further reduced by allowing the relative movement of the female and male shafts although a driver steers wheels.

Hereinafter, a telescopic shaft according to the second embodiment of the present invention will be described.

Figure 9:
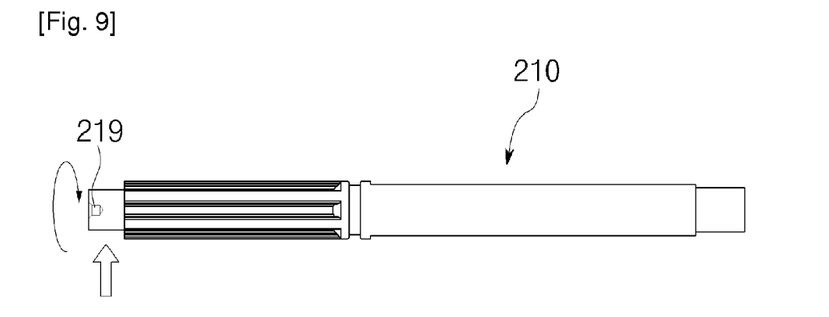
FIG. 9 is a plan view of a telescopic shaft according to the second embodiment of the present invention before forming a male shaft.
Figure 10:
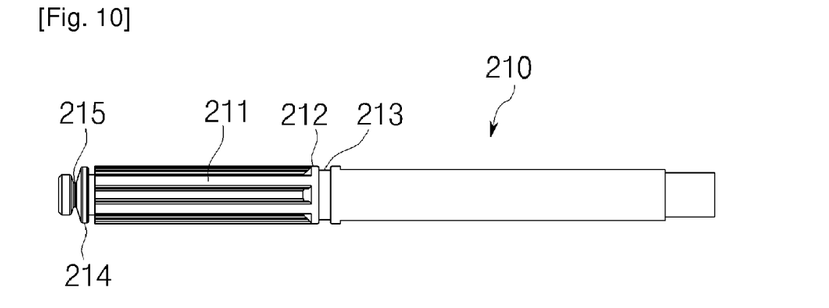
FIG. 10 is a plan view of a telescopic shaft according to the second embodiment of the present invention after forming a male shaft.
Figure 11:
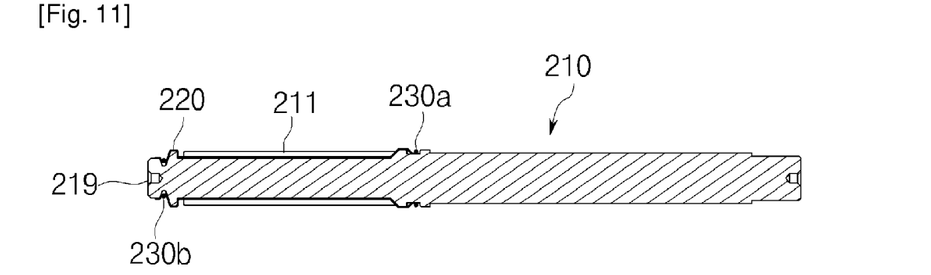
FIG. 11 is a cross-sectional view of a male shaft shown in FIG. 10.
Figure 12:
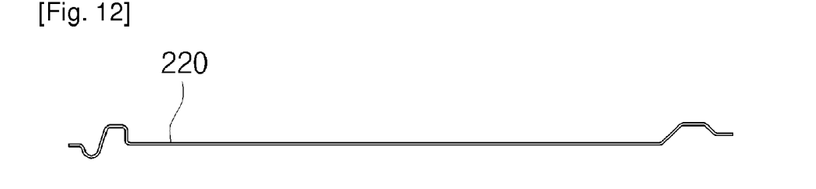
FIG. 12 is a cross-sectional view of a leaf spring according to the second embodiment of the present invention.

FIG. 9 is a plan view of a telescopic shaft according to the second embodiment of the present invention before forming a male shaft, FIG. 10 is a plan view of a telescopic shaft according to the second embodiment of the present invention after forming a male shaft, FIG. 11 is a cross-sectional view of a male shaft shown in FIG. 10, and FIG. 12 is a cross-sectional view of a leaf spring according to the second embodiment of the present invention;

Since the female shaft and the balls of the second embodiment are identical to those of the first embodiment, the detail descriptions thereof are omitted.

As shown in FIGS. 10 and 11, a male shaft 210 of the telescopic shaft according to the second embodiment includes a plurality of first splines 211 on an outer circumferential surface thereof in an axial direction, first spline grooves between the adjacent first splines 211, a first derail prevention protrusion 212 on an outer circumferential surface at a middle part of the male shaft 210 in a radius direction, a first fixing groove 213 formed at the side of the first derail prevention protrusion 212 in an opposite direction of the first splines 211, a second derail prevention protrusion 214 on an outer circumferential surface at one end of the first spline 211 of the mail shaft 210 in a radius direction, and a second fixing groove 215 at an outer side of the second derail prevention protrusion 214.

A leaf spring 220 of the telescopic shaft according to the second embodiment includes one end extending to a first fixing groove 213 and fixed by a fixing ring 230a and the other end extending to a second fixing groove 215 and fixed by a fixing ring 230b.

Unlike a related art that prevents derailing of a leaf spring and balls using a fixing ring connected to a fixing groove and a stopper plate, the first derail preventing protrusion 212 and the second derail prevention protrusion 214 function as a stopper for limiting movement of balls in an axial direction.

It is preferable to use a form rolling process to form the second derail prevention protrusion 214 of the male shaft 210 of the telescopic shaft according to the second embodiment.

The form rolling process is a typical rolling process that puts raw material between forming tools such as rolls while rotating the forming tools and carves a shape of a surface of the forming tools on the raw material.

The form rolling process produces a product having high hardness and easily forms a desired shape with a comparatively small processing power through making local contact between the raw material and the tools. Since the form rolling process does not generate chips, the form rolling process has advantages of high raw material usability, work-hardening by plastic deformation, dense formation, and a high processing speed.

As shown in FIG. 9, center grooves 219 are formed at a center of each end of the male shaft 210, and both ends of the male shaft 210 are fixed using the center groove 219. Then, the male shaft 210 rotates with an axial direction as a center and is pressurized in a thick arrow direction. Then, as shown in FIG. 10, the second derail prevention protrusion 214 and the second fixing groove 215 are simultaneously formed at one end of the male shaft 210.

After the form rolling process, the leaf spring 220 shown in FIG. 12 is disposed at the spline groove of the male shaft 210. As shown in FIG. 11, both ends of the leaf spring 220, which extend to the first fixing groove 213 and the second fixing groove 215, are disposed at both ends of the leaf spring 220, and fixed by the fixing rings 230a and 230b.

In the telescopic shaft according to the second embodiment, the hardness of the male shaft is enhanced because the first and second derail prevention shafts 212 and 214 function as a stopper that limits the movement of balls in an axial direction.

In the telescopic shaft according to the second embodiment, it is convenient to fix the fixing ring 230a because an axial diameter of a portion where the first fixing groove is formed and the diameter of the fixing ring are great. Also, the other fixing ring 230b is also safely disposed at the second fixing groove 215 through a part having a small diameter, and it is also easy to fix. Therefore, it is convenient to assembly the male shaft in the telescopic shaft.

Hereinafter, a male shaft of a telescopic shaft according to the third embodiment of the present invention will be described.

Figure 13:
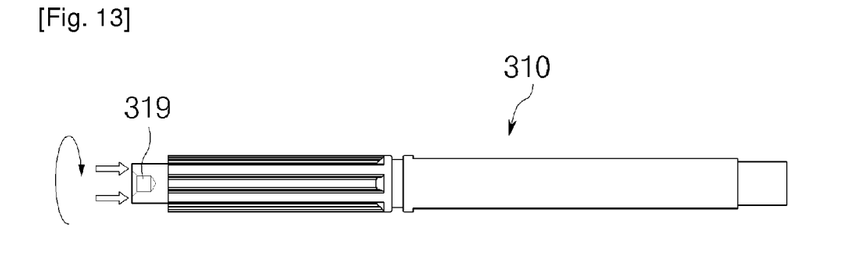
FIG. 13 is a plan view of a telescopic shaft according to the third embodiment of the present invention before forming a male shaft.
Figure 14:
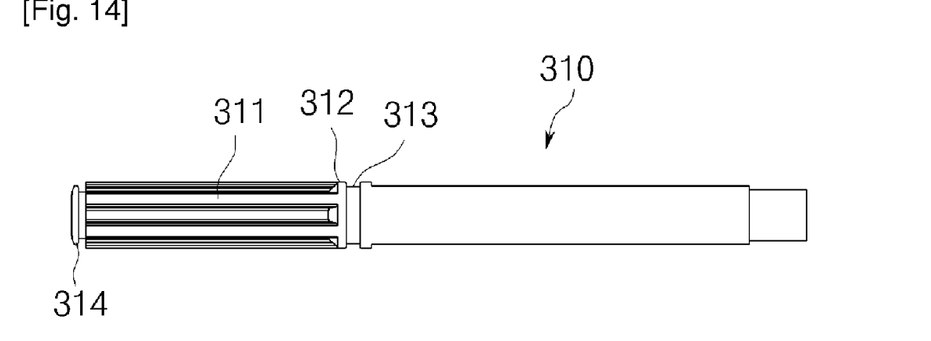
FIG. 14 is a plan view of a telescopic shaft according to the fourth embodiment of the present invention after forming a male shaft.
Figure 15:
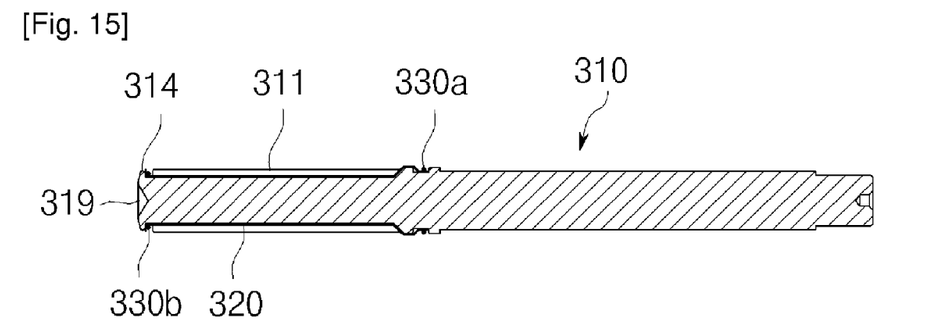
FIG. 15 is a cross-sectional view of a male shaft shown in FIG. 14.
Figure 16:
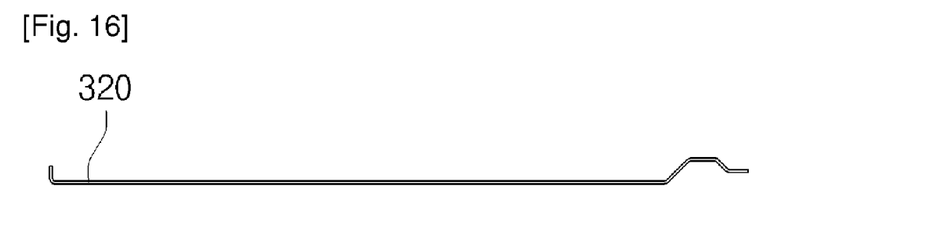
FIG. 16 is a cross-sectional view of a leaf spring according to the third embodiment of the present invention.

FIG. 13 is a plan view of a telescopic shaft according to the third embodiment of the present invention before forming a male shaft, FIG. 14 is a plan view of a telescopic shaft according to the fourth embodiment of the present invention after forming a male shaft, FIG. 15 is a cross-sectional view of a male shaft shown in FIG. 14, and FIG. 16 is a cross-sectional view of a leaf spring according to the third embodiment of the present invention.

Since the female shaft and the balls of the third embodiment are identical to the first embodiment, the detail description thereof is omitted.

As shown in FIGS. 13 and 14, the male shaft 310 of the telescopic shaft according to the third embodiment of the present invention includes first splines 311 formed on an outer circumference thereof in an axial direction, first spline grooves between adjacent first splines 311, a third derail prevention protrusion 312 formed on an outer circumferential surface at a middle of the male shaft 310 in a radius direction, a third fixing groove 313 formed at the side of the third derail prevention protrusion 312, and a fourth derail prevention protrusion 314 on an outer circumferential surface at an end of the first spline 311 in the opposite direction of the first spline 311.

A leaf spring 320 of the telescopic shaft according to the third embodiment includes one end extending to a third fixing groove 313 and fixed by a fixing ring 330a and the other end disposed in the fourth derail prevention protrusion 314 and fixed by a fixing ring 330b.

Unlike the first embodiment that prevent the leaf spring and the balls from derailing using the fixing ring fixed at the fixing groove and the stopper plate, the third derail prevention protrusion 212 and the fourth derail prevention protrusion 212 function as a stopper that limits movement of balls in an axial direction.

It is preferable to use a spinning process to form the fourth derail prevention protrusion 314 of the male shaft 310 according to the third embodiment.

The spinning process is a process that produces a container in a cone shape or a process that narrows down an entry of a container. The spinning process forms a shape of a raw material by mounting a predetermined frame at a rotation shaft of a spinning lathe, putting and rotating a circular raw material to the frame, and pushing a rod or a roller to the raw material.

The spinning process can produce a large produce with small sized equipment and can easily form an narrow-down entry.

Moreover, it is possible to perform the same process through a heading process as well as the spinning process. The heading process is a process that forms a thick and short product by beating an end of a shaft such as a bolt or a rivet with a hammer.

As shown in FIG. 13, center grooves 319 are formed at a center of each end of the male shaft 310, and the both ends of the male shaft 310 are fixed using the center grooves 319. Then, the male shaft 310 rotates based on an axial direction as a center and is pressurized in a tick arrow direction, thereby forming the fourth derail prevention protrusion 314 at the end of the male shaft 310 as shown in FIG. 14.

After the spinning process, the leaf spring 320 of FIG. 16 is disposed at a spline groove of the male shaft 310. As shown in FIG. 15, one end of the leaf spring 320 extends to the third fixing groove 313 and the other end is disposed inside the fourth derail prevention protrusion 314. Then, the both ends of the leaf spring 320 are fixed by the fixing rings 330a and 330b.

The telescopic shaft according to the third embodiment has an advantage of the improved hardness of the male shaft because the third derail prevention protrusion 212 and the fourth derail prevention protrusion 214 each having a large diameter function as a stopper that limits movement of balls in an axial direction.

Also, it is easy to fix the male shaft through the fixing ring 330a because a part of the male shaft where the third fixing groove 313 is formed has a great diameter and because the fixing ring 330b is disposed inside the fourth derail prevention protrusion which has an equivalent diameter. Therefore, the telescopic shaft according to the third embodiment can be easily assembled.

While the present invention has been described with respect to certain preferred embodiments, it will be apparent to those skilled in the art that various changes and modifications may be made without departing from the scope of the invention as defined in the following claims.

The invention claimed is:

1. A telescopic shaft comprising:
a male shaft including a plurality of first grooves, a couple of fixing grooves, and a couple of derail prevention protrusions, which are formed on an outer circumferential surface of the male shaft, wherein the couple of fixing grooves are formed in an outer circumferential direction of the male shaft at an end portion and a middle portion of the male shaft in a longitudinal direction of the male shaft, the couple of derail prevention protrusions are formed at the end portion and the middle portion of the male shaft, wherein the plurality of first grooves are formed in an axial direction of the male shaft between the couple of fixing grooves;
a female shaft including a hollow space therein and a plurality of second grooves formed on an inner circumferential surface of the female shaft, wherein the plurality of second grooves are corresponding to the plurality of first grooves;
a plurality of balls disposed between the plurality of first grooves and the plurality of second grooves;
a recess formed at a bottom of the plurality of the first grooves;
a leaf spring inserted into the plurality of first grooves to support the plurality of balls within the plurality of first grooves, wherein a central portion of the leaf spring is positioned over the recess while both sides of the leaf spring are supported by the bottom, wherein the central portion of the leaf spring supports the plurality of balls; and
a couple of fixing rings inserted to the couple of fixing grooves and surrounding ends of the leaf spring to prevent the leaf spring from derailing.

2. The telescopic shaft of claim 1, wherein the leaf spring includes a depression formed on the central portion which supports the plurality of balls and located over the recess, wherein the depression contacts and supports the plurality of balls.

* * * * *